United States Patent
Becker et al.

(10) Patent No.: US 12,522,438 B2
(45) Date of Patent: Jan. 13, 2026

(54) BLOCK STORAGE ARRANGEMENT AND METHOD FOR OPERATING A BLOCK STORAGE ARRANGEMENT

(71) Applicant: Jungheinrich Aktiengesellschaft, Hamburg (DE)

(72) Inventors: Michael Becker, Hainburg (DE); Timm Morawietz, Tholey-Überroth (DE); Jörg Cavelius, Bad Vilbel (DE); Michael Reising, Offenbach (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 527 days.

(21) Appl. No.: 18/115,928

(22) Filed: Mar. 1, 2023

(65) Prior Publication Data
US 2023/0278797 A1    Sep. 7, 2023

(30) Foreign Application Priority Data
Mar. 3, 2022   (EP) ..................... 22159998

(51) Int. Cl.
*B65G 1/137*    (2006.01)

(52) U.S. Cl.
CPC ...... *B65G 1/1373* (2013.01); *B65G 2201/025* (2013.01)

(58) Field of Classification Search
CPC .................. B65G 1/1373; B65G 2201/025
See application file for complete search history.

(56) References Cited

U.S. PATENT DOCUMENTS

| 2016/0104880 A1 | 4/2016 | Gao et al. |
| 2021/0053777 A1* | 2/2021 | Harting ............... B65G 57/302 |
| 2021/0122569 A1* | 4/2021 | Cavelius ............. B65G 1/0485 |
| 2022/0144546 A1* | 5/2022 | Tendo .................... G05D 1/02 |

FOREIGN PATENT DOCUMENTS

| DE | 10 2016 125 788 | 6/2018 |
| DE | 11 2019 006 910 | 11/2021 |
| EP | 3 812 307 | 4/2021 |
| WO | 2020/169287 | 8/2020 |

OTHER PUBLICATIONS

Europe Search Report/Office Action conducted in counterpart Appln. No. 22159998.8 (Sep. 14, 2022).

* cited by examiner

*Primary Examiner* — Kyle O Logan
(74) *Attorney, Agent, or Firm* — GREENBLUM & BERNSTEIN, P.L.C.

(57) ABSTRACT

A block storage arrangement and method of operating same. The block storage arrangement includes multiple container stacking compartments; a loading compartment arranged below the container stacking compartments; at least one loading vehicle, which is movable in the loading compartment and with which containers are storable from below into a container stacking compartment and/or removable from below from the container stacking compartment, has an electric drive assembly and an electrically rechargeable battery; and at least one transfer station. An electrical charging device for the battery is arranged in the transfer station.

15 Claims, 4 Drawing Sheets

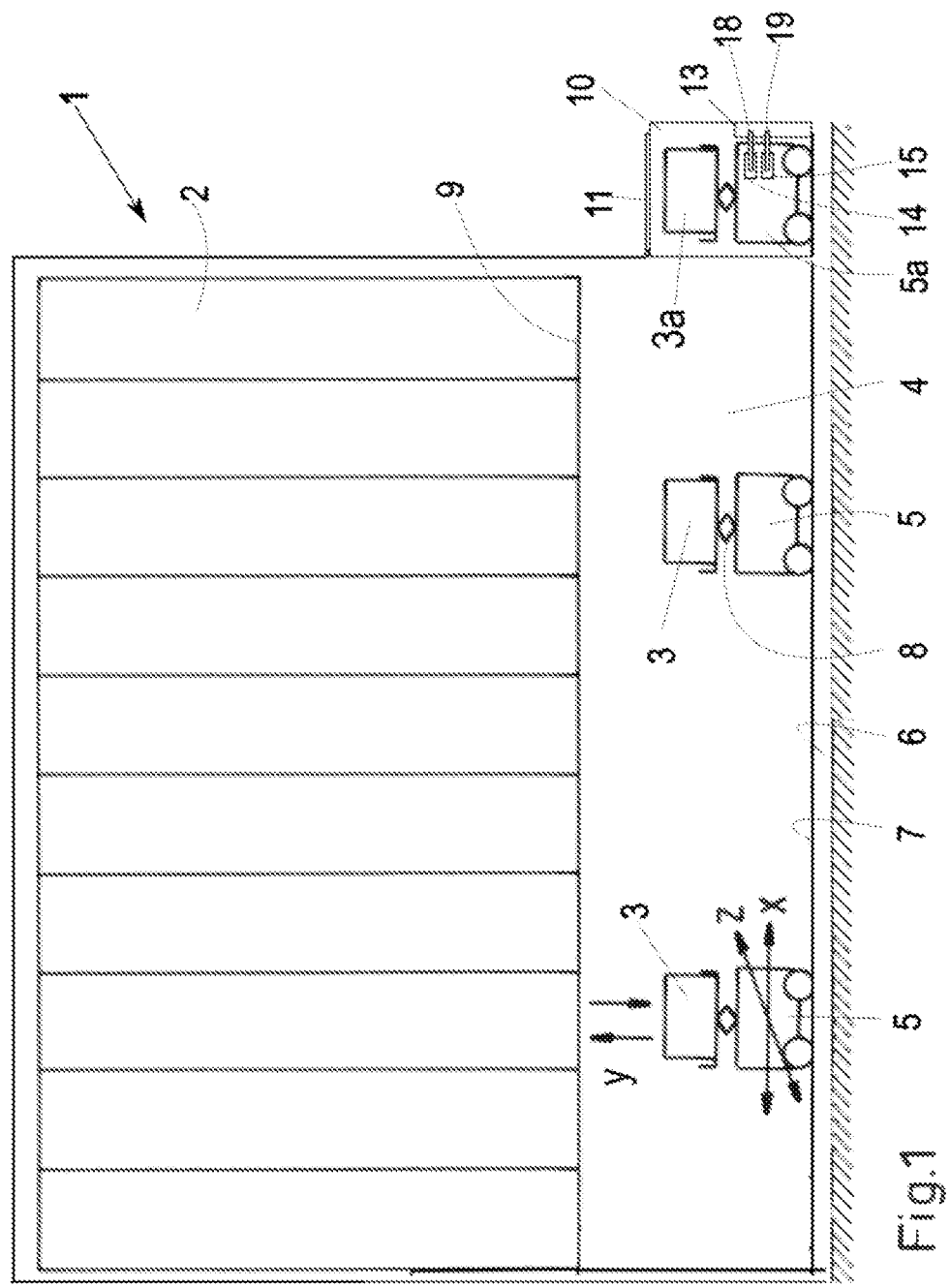

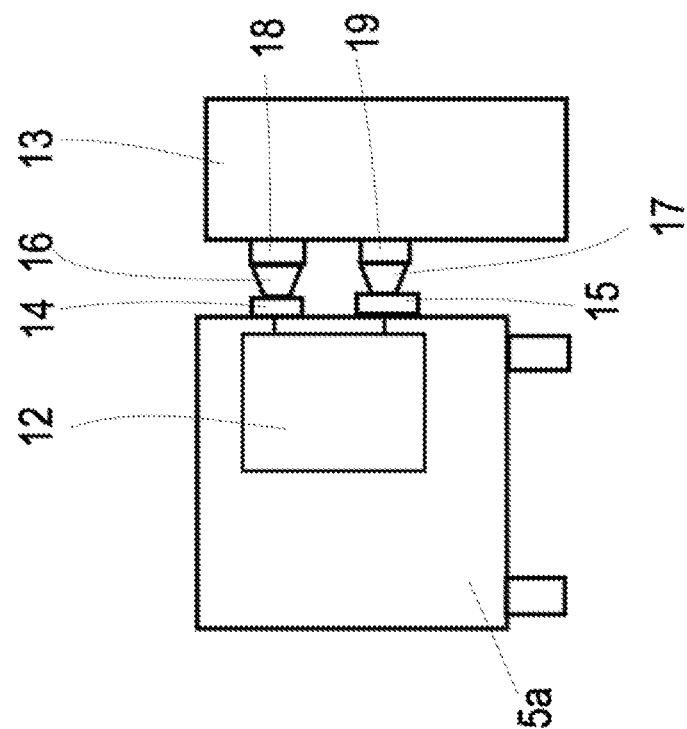
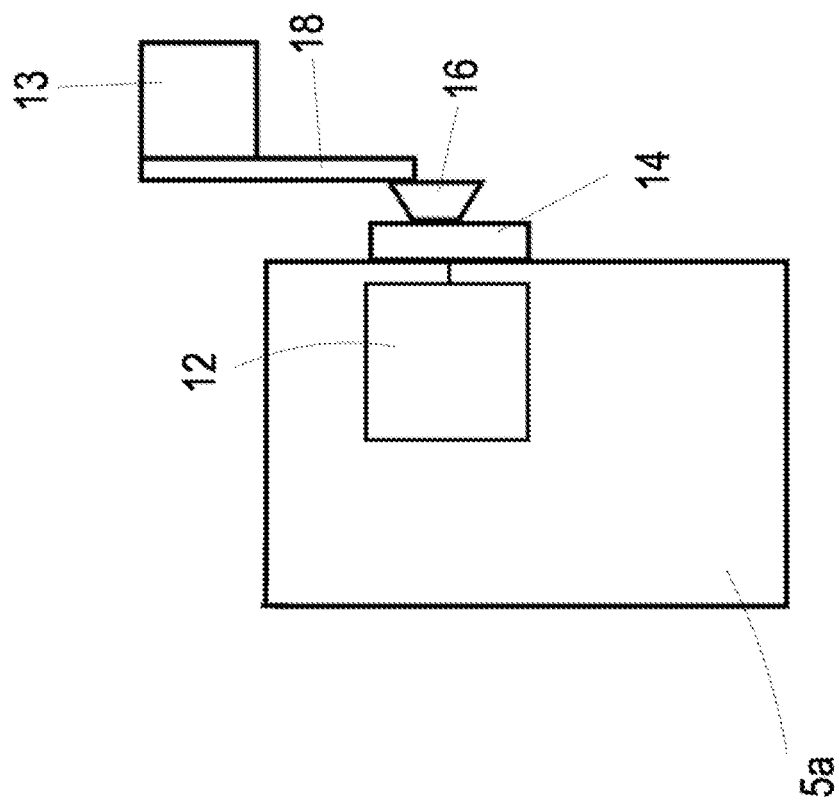

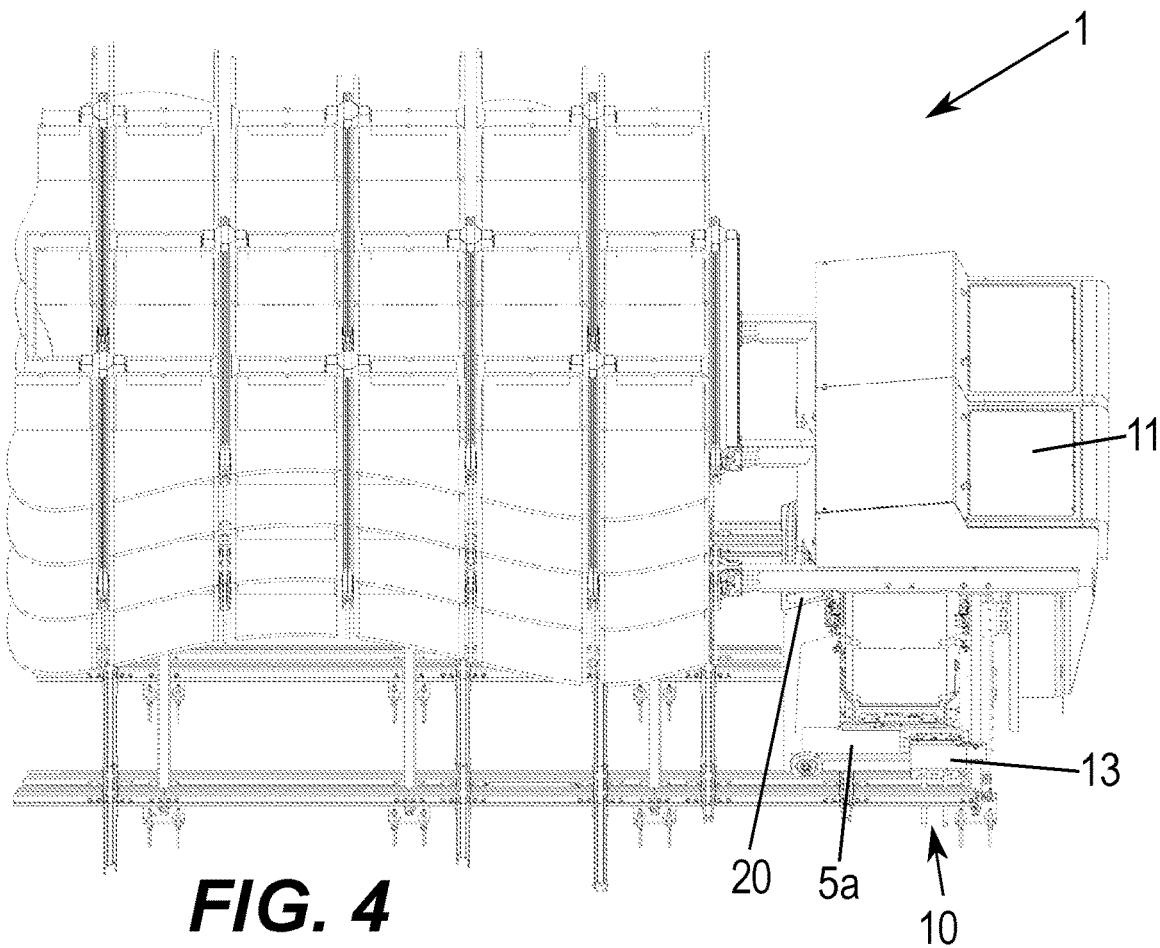
FIG. 4
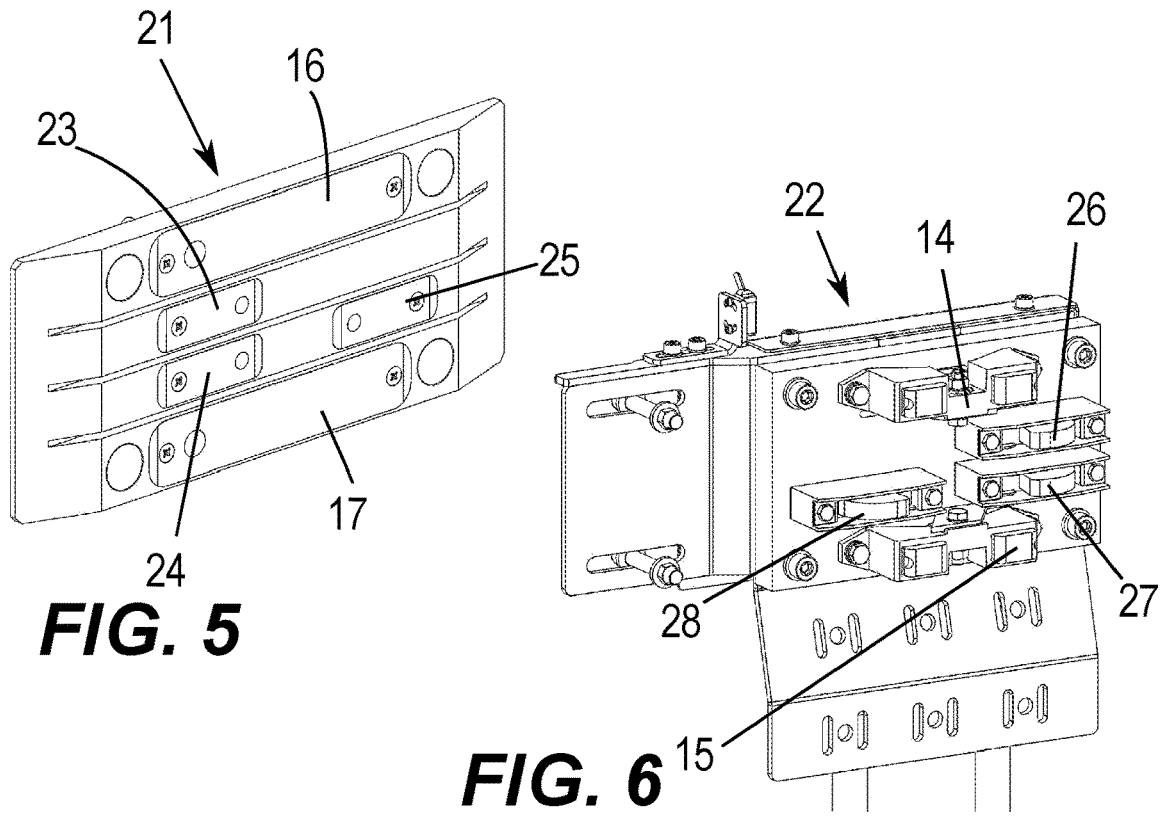
FIG. 5
FIG. 6

BLOCK STORAGE ARRANGEMENT AND METHOD FOR OPERATING A BLOCK STORAGE ARRANGEMENT

CROSS-REFERENCE TO RELATED APPLICATION

This application claims priority under 35 U.S.C. § 119(a) to Europe Application No. 22 15 9998.8 filed Mar. 3, 2022, the disclosure of which is expressly incorporated by reference herein in its entirety.

BACKGROUND

1. Field of the Invention

The invention relates to a block storage arrangement having multiple container stacking compartments, a loading compartment arranged below the container stacking compartments, at least one loading vehicle which is movable in the loading compartment and with which containers can be stored from below in a container stacking compartment and can be removed from below from the container stacking compartment, and which has an electric drive assembly and an electrically rechargeable battery, and at least one transfer station.

Furthermore, the invention relates to a method for operating a block storage arrangement having multiple container stacking compartments and a loading compartment arranged below the container stacking compartments, in which method, with the aid of a loading vehicle movable in the loading compartment, containers are stored from below in the container stacking compartments and are removed downward from the container stacking compartments, the loading vehicle is electrically driven via a rechargeable battery which is carried along in the loading vehicle, and the loading vehicle is moved into a transfer station.

2. Discussion of Background Information

In a block storage arrangement, containers are stored in the form of container stacks. The containers are located directly one on top of the other so that a large container density within a stack can be achieved. The individual container stacks can also be placed relatively close to one another perpendicularly to the direction of gravity so that the available space can be utilized well in order to accommodate the largest possible number of containers.

In order to be able to access an object which is arranged in a container, the loading vehicle drives through the loading compartment to a position below the container stacking compartment in which the relevant container is arranged. The loading vehicle can then remove the container and transport it into the transfer station. The transfer station may be designed in different ways. In one embodiment, an operator can access the interior of the container in the transfer station in order to, for example, remove the object or in order to store another object in the container. In another embodiment, the transfer station can also be used to transfer the container to a transport or conveying device or to transfer it from the transport or conveying device back into the block storage arrangement. It is also possible that in the transfer station, the loading vehicle delivers the container to an intermediate conveyor, which then conveys the container to a position in which an operator has access to the interior of the container.

If the desired container is not located at the lowest position in the stack, the loading vehicle must perform one or more rearrangement operations, i.e., containers must be removed from the respective container stacking compartment and stored in one or more other container stacking compartments until the desired container is located at the lowest position and can be removed from the container stacking compartment.

In the same way, the loading vehicle can be used to store the container again into a container stacking compartment.

The loading vehicle is driven electrically. The electrical energy required for the drive is provided by a rechargeable battery. This means that the battery of the loading vehicle must be charged from time to time, wherein the loading vehicle is not available during these charging times. Therefore, either a larger number of loading vehicles must be provided in order to ensure high availability of the block storage arrangement, or the productivity of the block storage arrangement is reduced because the loading vehicle is not available during the charging breaks.

SUMMARY

The object of the invention is to enable high productivity of the block storage arrangement in a cost-effective manner.

This object is achieved in a block storage arrangement of the type mentioned at the beginning in that an electrical charging device for the battery is arranged in the transfer station.

The loading vehicle can thus always be charged when it has been driven into the transfer station. As mentioned above, the transfer station can have different designs. All designs have in common that the loading vehicle must remain in a defined position for a certain time, for example in order to deliver or receive a container there or to keep a container ready for an operator so that the operator can remove an object from the container or store an object in the container. During this time, the battery can be charged by the charging device. Since the loading vehicle is usually only located in the transfer station for a short period of time, the amount of electrical energy that can be transmitted during this time is limited. However, since the loading vehicle is repeatedly charged in the transfer station, this limited amount is sufficient to enable continuous operation of the loading vehicle. It is sufficient if the elements required for transmitting electrical energy to the loading vehicle are present in the transfer station. The elements required for providing the electrical energy, for example a transformer or a converter circuit, may also be arranged at a different position.

Preferably, the charging device has a stationary contact arrangement, with which a vehicle contact arrangement comes into contact when driving into the transfer station. When driving into the transfer station, the loading vehicle thus automatically establishes contact with the charging device. Intervention by an operator is not necessary. Charging of the loading vehicle is thus automated. Charging can already start when the loading vehicle drives into the transfer station and ends when the loading vehicle leaves the transfer station. Charging is thus also possible during a movement of the loading vehicle.

For this purpose, the stationary contact arrangement can have a certain length in the movement direction of the loading vehicle when moving into and out of the transfer station, for example a length of 1 m. The vehicle contact arrangement can also have a certain length or multiple contacts can be provided one behind the other in the movement direction so that charging can also take place during a driving movement of the loading vehicle.

It is preferred here that at least one of the contact arrangements has a compressive force generation device which acts in the direction of the other contact arrangement when the loading vehicle is located in the transfer station. When the loading vehicle is located in the transfer unit, i.e., drives into it, stops or drives out of it, the stationary contact arrangement of the charging device and the vehicle contact arrangement can put pressure on one another with a certain force so that good electrical contact between these two contact arrangements results. This ensures a sufficiently good current flow from the charging device to the battery, even when the loading vehicle moves relative to the stationary contact arrangement. The two contact arrangements can also be referred to as "sliding contacts."

Preferably, the charging device is designed for a charging current having a current intensity of at least 80 A, preferably in the range of 80-140 A. The charging device can charge the battery at a relatively high current intensity so that a sufficient amount of electrical energy can be transmitted into the battery.

Preferably, the charging device is adapted to the battery and loads the battery at a C-rate of at least 10. Here, the C-rate describes the ratio of the charging current intensity to the capacitance of the battery. Thus, if the battery has a capacitance of 8 ampere-hours (Ah), this means that the charging current is 80 A. The battery can thus be charged at a very high current intensity.

Preferably, the charging device charges the battery at least with an amount of energy that the loading vehicle consumes on average in a working cycle between two stays in the transfer station. The amount of energy used in a working cycle in a block storage arrangement can be determined with sufficient accuracy by simulations. It depends, inter alia, on the mass that the containers have and that must be handled by the loading vehicle. Depending on the mass of the container, the path that the loading vehicle must travel, and the number of rearrangement operations, the loading vehicle requires a few watt-hours (Wh) for a working cycle, many times less than 10 Wh. Since only relatively small amounts of energy can ever be recharged, the dwell time in the transfer station is sufficient to transfer sufficient energy to the loading vehicle for its operation.

Preferably, the loading vehicle has a lifting device which is operatively connected to an electric drive, wherein the electric drive operates as an electric generator and feeds electrical energy into the battery when the lifting device is lowered. When removing a container from a container stacking compartment, the container, possibly with further containers stacked above it, must be raised until a holding device, which holds the container stack in the container stacking compartment, comes loose and can be released. The container is then lowered with the further containers located thereon until the remaining container stack is held again by the holding device. This lowering movement takes place over the height of the container and beyond, i.e., the extension of the container in the direction of gravity. The energy obtained can be used to charge the battery.

Preferably, the battery is a lithium-titanium-oxide battery. Such an LTO battery can be charged relatively quickly, i.e., it tolerates high charging currents so that sufficient electrical energy can be fed into the battery in a short time. The dwell time in the transfer station is then sufficient to ensure sufficient energy supply.

The object is achieved with a method of the type mentioned at the beginning in that the battery is charged while the loading vehicle is located in the transfer station.

The time in which the loading vehicle is at a defined location, namely the transfer station, is thus used. If the loading vehicle is located in the transfer station, it remains at rest or moves slowly relative to the charging device for a time so that the battery can be charged during this time. Even if this time is only short, a sufficiently large amount of electrical energy can be transmitted from the charging device to the battery.

When driving into the transfer station, the loading vehicle preferably automatically establishes contact between the battery and a charging device. Manual intervention by an operator is then not necessary. Electrical energy can then possibly already be transmitted from the charging device to the battery during the driving-in process. Even during the driving-out process, charging is still possible as long as the contacts of the loading vehicle and the contacts of the charging device still have electrical contact.

Preferably, the battery is charged with a C-rate of at least 10. As mentioned above, this results in a charging current that is ten times higher than the capacitance of the battery in A hours. Relatively high charging currents thus result, which are sufficient to transfer the required amount of electrical energy from the charging device into the battery.

Preferably, during the stay in the transfer station, an amount of energy which corresponds to at least the amount of energy which the loading vehicle consumes in an average working cycle between two stays in the transfer station is transferred to the battery. This amount of energy can be determined in advance by simulations. It depends, inter alia, on the average weight of the containers that must be handled. The extension of the block storage arrangement in a plane perpendicular to the direction of gravity is also a factor here.

Preferably, the loading vehicle used has a lifting device which is operatively connected to an electric drive, wherein the electric drive is operated as a generator when the lifting device is lowered. When the electric drive is operated as a generator, it converts the potential energy of a container during lowering into electrical energy which can be fed into the battery. This results in energy recovery, which can advantageously be used in order to make the operating time of the loading vehicle largely uninterrupted.

Preferably, the battery used is a lithium-titanium-oxide battery.

Such an LTO battery tolerates relatively large charging currents. An LTO battery is known, for example, from US 2016/0104880 A1.

Embodiments are directed to a block storage arrangement that includes multiple container stacking compartments; a loading compartment arranged below the container stacking compartments; at least one loading vehicle, which is movable in the loading compartment and with which containers are storable from below into a container stacking compartment and/or removable from below from the container stacking compartment, has an electric drive assembly and an electrically rechargeable battery; and at least one transfer station. An electrical charging device for the battery is arranged in the transfer station.

According to embodiments, the electrical charging device can have a stationary contact arrangement and the at least one loading vehicle can have a vehicle contact arrangement, and the vehicle contact arrangement may conic into contact with the stationary contact arrangement when the at least one loading vehicle is driven into the transfer station. At least one of the stationary contact arrangement or the vehicle contact arrangement may have a compressive force generation device, which acts in the direction of an other of the at least one of the stationary contact arrangement or the vehicle contact arrangement when the loading vehicle is located in the transfer station.

In accordance with embodiments, the electrical charging device may be designed for a charging current having a current intensity of at least 80 amperes. Preferably, the electrical charging device can be designed for a charging current having a current intensity in a range of 80 to 140 amperes.

In other embodiments, the electrical charging device may be adapted to the battery and charges the battery at a C-rate of at least 10.

According to other embodiments, the electrical charging device can charge the battery at least with an amount of energy that the loading vehicle consumes on average in a working cycle between two stays in the transfer station.

In accordance with still other embodiments, the loading vehicle may have an electric drive and a lifting device that is operatively connected to the electric drive, and the electric drive can operate as an electric generator and feeds electrical energy into the battery when the lifting device is lowered.

In still other embodiments, the battery may be a lithium-titanium-oxide battery.

Embodiments are directed to a method for operating a block storage arrangement having multiple container stacking compartments, a loading compartment arranged below the container stacking compartments, and a loading vehicle, movable in the loading compartment, to store containers from below in the container stacking compartments and to remove containers downwardly from the container stacking compartments. The loading vehicle has a rechargeable battery by which the loading vehicle is electrically driven, and the method includes driving the loading vehicle into a transfer station; and charging the rechargeable battery while the loading vehicle is located in the transfer station.

According to embodiments, when driving into the transfer station, the loading vehicle can automatically establish contact between the rechargeable battery and an electrical charging device.

In accordance with other embodiments, the rechargeable battery can be charged at a C-rate of at least 10.

In embodiments, during a stay in the transfer station, the rechargeable battery may be supplied with an amount of energy which corresponds to at least an amount of energy that the loading vehicle consumes in an average working cycle between two stays in the transfer station.

According to other embodiments, the loading vehicle may further have an electric drive and a lifting device that is operatively connected to the electric drive, and the method can further include operating the electric drive as a generator when the lifting device is lowered.

In accordance with still yet other embodiments, the rechargeable battery can be a lithium-titanium-oxide battery.

Other exemplary embodiments and advantages of the present invention may be ascertained by reviewing the present disclosure and the accompanying drawing.

BRIEF DESCRIPTION OF THE DRAWINGS

The invention is described below with reference to a preferred exemplary embodiment in conjunction with the drawing. In the figures:

FIG. 1 shows a schematic representation of a block storage arrangement;

FIG. 2 shows a schematic plan view of a loading vehicle in a transfer station:

FIG. 3 shows a schematic front view of the loading vehicle in the transfer station;

FIG. 4 shows a schematic view of a second embodiment of a block storage arrangement;

FIG. 5 shows a schematic view of a vehicle contact arrangement;

FIG. 6 shows a schematic view of a stationary contact arrangement;

DETAILED DESCRIPTION

Figure 7:
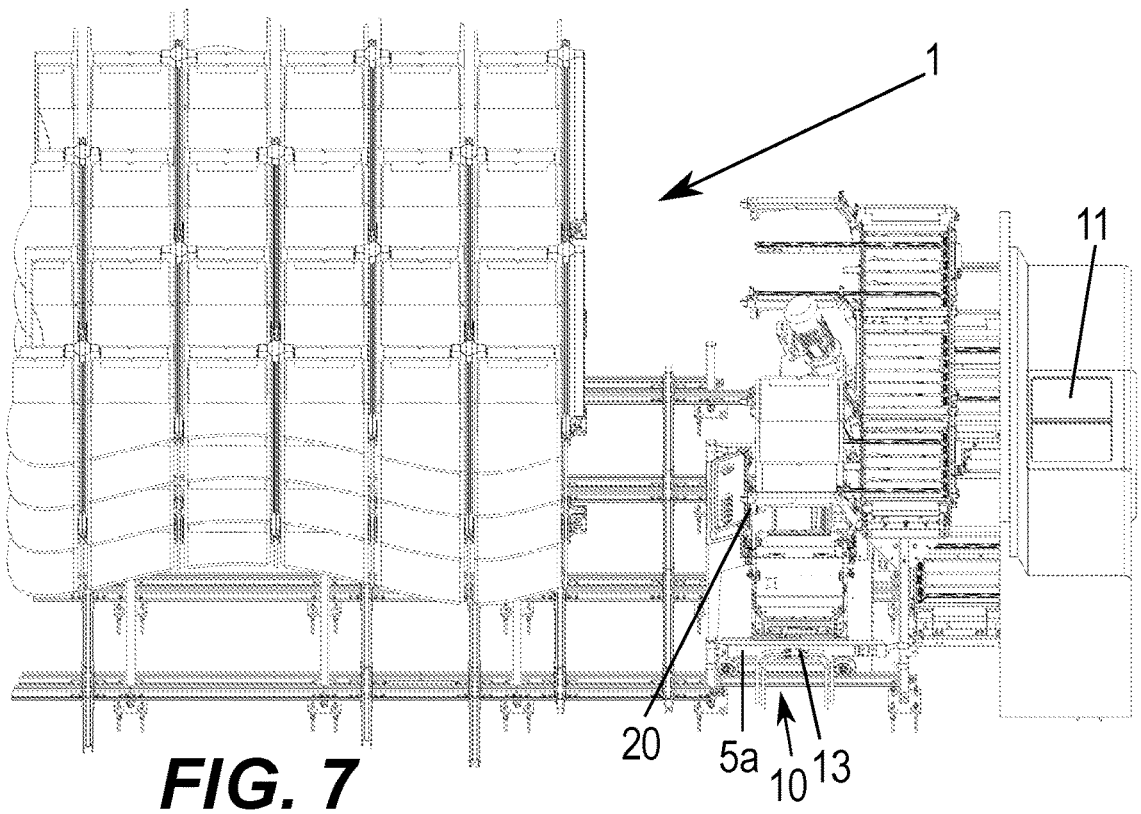
FIG. 7 shows a schematic view of a third embodiment of a block storage arrangement.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Identical and corresponding elements are denoted by the same reference signs in all figures.

FIG. 1 shows, in a highly schematic manner, a block storage arrangement 1 with multiple container stacking compartments (spaces) 2, which, as can be seen in FIG. 1, are arranged next to one another in a row in the X-direction. Multiple rows of container stacking compartments 2 can be arranged one behind the other perpendicularly thereto, i.e., in the Z-direction. The container stacking compartments 2 are thus arranged in rows and columns in a matrix-like manner. Each container stacking compartment 2 can receive a stack of containers 3.

A loading compartment (space) 4 is arranged below the container stacking compartments 2. Multiple loading vehicles 5 can be moved in the loading compartment 4. The loading vehicles 5 can be moved both in the X-direction and in the Z-direction. The loading vehicles 5 can, for example, be moved on a floor 6. In the present exemplary embodiment, however, rails 7 are provided, on which the loading vehicles can be moved. For moving, the loading vehicle has an electric traction drive (not shown in more detail).

The loading vehicles 5 serve to store a container 3 in a container stacking compartment 2 or to remove a container 3 from a container stacking compartment 2.

For storing a container 3 in a loading compartment 2, the loading vehicle 4 is moved under the desired container stacking compartment 2. The container 3 is raised by an electrically driven lifting device B of the loading vehicle in the Y-direction, i.e., counter the direction of gravity, until it enters the container stacking compartment 2. The container stacking compartment 2 is separated from the loading compartment 4 by a frame 9. An opening through which a container 3 can be moved is provided for each container stacking compartment 2 in the frame 9. A holding device (not shown in greater detail) is provided in the region of the opening. When the container 3 is moved past the holding device and is thereafter lowered again, it is held above the loading compartment by the holding device. If one or more containers were previously already located in the container stacking compartment 2, these containers are raised by the container 3 to be newly stored, so that a stack of containers is located in the container stacking compartment 2.

In order to remove a container 3 from a container stacking compartment 2, the loading vehicle 5 is again used. The loading vehicle 5 is positioned below the container stacking compartment 2 from which the container is to be removed. The lifting device 8 is moved upward counter to the direction of gravity, i.e., in the Y-direction, and raises the lowermost container of a stack until it comes loose of the holding device. The holding device is then held open and the container 3 can then be lowered with the aid of the lifting device 8.

Laterally in the direction of gravity, a transfer station 10 is arranged next to the loading compartment 4. In the present case, the transfer station 10 has a flap 11, which can be opened in order to enable an operator to access a container 3*a*, which has been moved into the transfer station 10 with the aid of a loading vehicle 5*a*. The operator need only open the flap 11 in order to reach into the container 3*a* from above in order to remove an object located therein and/or to store an object in the container 3*a*.

The transfer station 10 may also be designed in another way. It may be provided, for example, that a transfer of the container 3*a* to a horizontal conveyor or from a horizontal conveyor to the loading vehicle 5*a* is possible in the transfer station 10. In a further embodiment, the transfer station 10 can be designed such that the loading vehicle 5*a* transfers the container 3*a* to an intermediate conveyor, which then conveys the container 3*a* to below the flap 11 so that the loading vehicle 5*a* need only remain shortly in the transfer station 10, but an operator still has sufficient time to have access to the container 3*a*.

The loading vehicles 5, 5*a* have a rechargeable battery 12 (see FIGS. 2 and 3), which may also be referred to as an accumulator. The battery 12 supplies the electrical energy for the traction drive and the lifting device 8. This is shown only for the loading vehicle 5*a*. While the other loading vehicles 5 can also designed in the same way, details of these other vehicles 5 are not shown for reasons of clarity.

An electrical charging device 13 for the battery 12 is arranged in the transfer station 10. When the loading vehicle 5*a* enters the transfer station 10, it comes into electrical contact with the charging device 13, as explained further. It is thus possible to charge the battery 12 of the loading vehicle 5*a* as long as the loading vehicle 5*a* is located in the transfer station 10.

The charging device 13 is designed to charge the loading vehicle 5*a* at a relatively high current intensity. In the present case, the charging current intensity is at least 80 amperes; preferably, the charging current intensity is in the range of 80 to 140 amperes.

The charging device 13 is adapted to the battery 12 and charges the battery 12 at a C-rate of at least 10. Here, the C-rate describes the ratio of the charging current intensity to the capacitance of the battery 12. Thus, this means that, if the battery 12 has a capacitance of 8 ampere-hours (Ah), the charging current is 80 amperes. The battery 12 can thus be charged at a very high current intensity.

The charging device 13 charges the battery 12 during the time, in which the loading vehicle 5*a* is located in the transfer station, at least with an amount of energy which the loading vehicle consumes on average in a working cycle between two stays in the transfer station. This amount of energy is sufficient to enable continuous operation of the loading vehicle 5*a*. There are working cycles in which the loading vehicle 5*a* consumes more than the currently received amount of energy. On the other hand, there are also working cycles in which the loading vehicle 5*a* consumes less than the amount of energy received. On average, a sufficient amount of energy is thus supplied to the loading vehicle 5*a*.

The amount of energy that the loading vehicle 5*a* consumes on average in a working cycle between two stays in the transfer station 10 can be determined with sufficient accuracy for a block storage arrangement 1 by simulation. The loading vehicle 5*a* substantially consumes electrical energy in two ways: on the one hand, the loading vehicle 5*a* must raise and lower a container 3, 3*a*. On the other hand, the loading vehicle 5*a* must transport a container 3, 3*a* from a container stacking compartment 2 into the transfer station 10. If the container 3*a* to be transported into the transfer station 10 is not the lowermost container of a stack, the loading vehicle 5 must also perform "restacking operations," i.e., the respectively lowermost container of a container stack must be removed from the container stacking compartment 2 until the desired container has reached the lowermost position. The removed containers must then be temporarily stored in another container stacking compartment.

The energy required for raising a container 3, 3*a* also depends on the mass of the container. In many cases, the electrical energy consumed in a working cycle is in the order of magnitude of significantly less than 10 watt-hours (Wh). Only in the case of heavier containers, the amount of energy in a working cycle may even be more than 10 Wh, but, as a rule, it remains below 20 Wh even then.

If the battery 12 has, for example, a relaxation of 60 volts, this corresponds to a consumption of 0.166 Ah in the case of an energy consumption of 10 Wh. If the charging device 13 charges at 80 amperes, then this energy consumption is replaced again in less than eight seconds. The dwell time of the loading vehicle 5*a* in the transfer station 10, i.e., the time from the start of the driving-in process until the end of the driving-out process, is generally significantly longer.

When a container 3 is lowered, the lifting device 8 can also operate as a generator, i.e., when a container 3 is lowered, the potential energy of the container 3 is converted into electrical energy, which then in turn charges the battery 12 of the loading vehicle 5*a*.

The battery 12 is preferably a lithium-titanium-oxide battery (LTO battery). Such an LTO battery can be charged relatively quickly, i.e., at sufficiently high charging currents so that only short times are required in order to transmit a sufficient amount of energy from the charging device 13 to the battery 12.

The loading vehicle 5*a* has at least two contact surfaces 14, 15. These contact surfaces 14, 15 are arranged laterally on the loading vehicle 5*a*, i.e., parallel to the direction with which the loading vehicle 5*a* is moved into the transfer station 10. The contact surfaces 14, 15 form a vehicle contact arrangement.

The charging device 13 has a stationary contact arrangement with at least two contacts 16, 17. Each contact 16, 17 is arranged on a compressive force generation device 18, 19, which, in the simplest case, can be designed as a leaf spring. The compressive force generation device 18, 19 ensures that the contacts 16, 17 of the stationary contact arrangement reliably come into contact with the vehicle contact arrangement 14, 15 when the loading vehicle 5*a* is moved into the transfer station 10. As can be seen in FIGS. 2 and 3, the contacts 16, 17 of the stationary contact arrangement can be chamfered so that they can be easily moved against the force of the compressive force generation device 18, 19 when the loading vehicle 3a is driven into the transfer station 10. As a result, as described, sufficient electrical contact is established, specifically automatically, without further handling steps being necessary for this purpose.

FIG. 4 shows a second embodiment of a stack storage arrangement 1. In contrast to the embodiment according to FIG. 1, the loading vehicle 5a no longer moves the container 3a to directly below the flap but transfers the container 3a to a conveyor 20, which removes the container 3a from the loading vehicle 5a and conveys it to below the flap 11. The time in which the loading vehicle 5a must remain in the transfer station 10 can thus be kept short. The conveyor 20 can convey the container 3a both in the direction in which the loading vehicle 5a drives into the transfer station 10 and transversely thereto, if necessary. The precise design of the conveyor 20 is of minor importance here.

Since less time is now available in which the loading vehicle 5a is in the transfer station 10, a charging strip 21 (see FIG. 5), which has a length of, for example, greater than 1 m, is used for the stationary contacts 16, 17 of the charging device 13. The stationary contacts 16, 17 can also be designed to be correspondingly long. The vehicle contacts 14, 15 are arranged on a current collector 22 shown in FIG. 6. It is thus possible for a charging process to already start when the loading vehicle 5a drives into the transfer station 10 and to only end when the loading vehicle 5a leaves the transfer station 10. A transmission of electrical energy from the charging station 13 to the loading vehicle 5a is thus possible in the transfer station 10 even during a driving movement of the loading vehicle 5a. The time that the loading vehicle 5a needs to drive into and out of the transfer station can thus also be used for charging.

Both the charging strip 21 and the current collector 22 can also have auxiliary contacts 23 to 28, which do not necessarily have to come into contact with one another during the driving-in and driving-out processes. The auxiliary contacts 23 to 25 of the charging strip 21 can therefore be designed to be shorter than the stationary contacts 16, 17. These auxiliary contacts 23 to 25 of the charging strip 21 are only in a permanent contact with the auxiliary contacts 26 to 28 of the current collector 22 when the loading vehicle is stationary in the transfer station 10.

Figure 8:
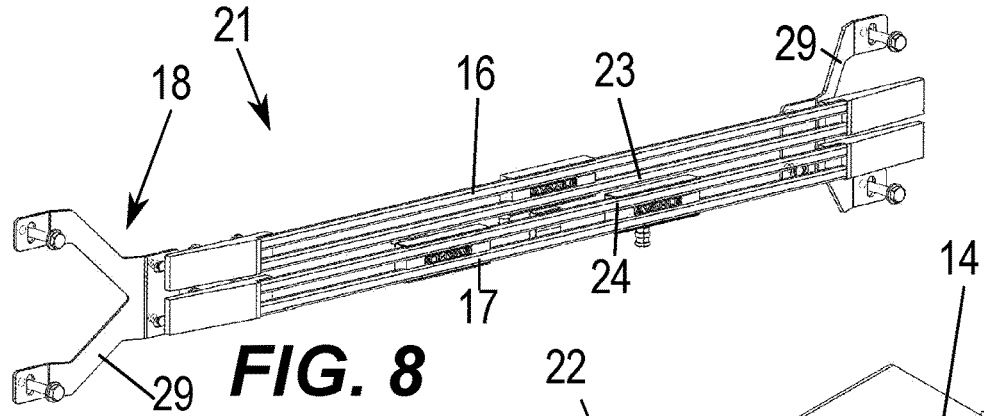
FIG. 8 shows a schematic view of a further embodiment of a vehicle contact arrangement.
Figure 9:
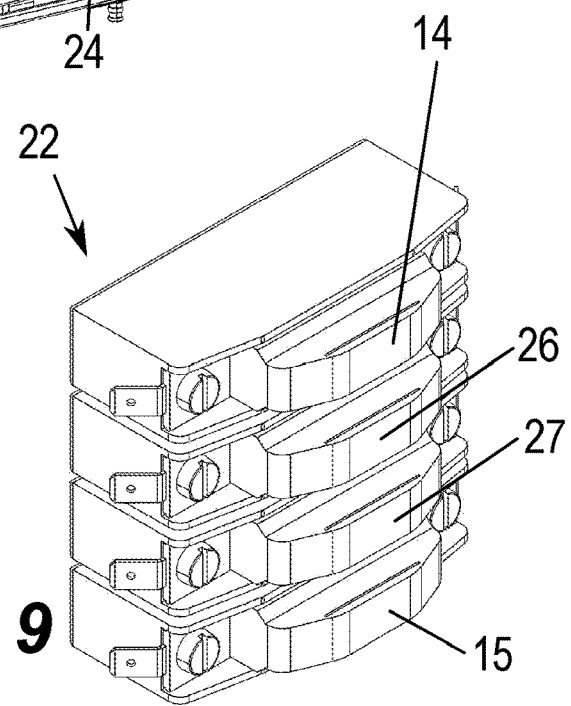
FIG. 9 shows a schematic view of a further embodiment of a stationary contact arrangement.

FIGS. 7 to 9 show a further embodiment of the block storage arrangement 1, in which, in contrast to the embodiment according to FIGS. 4 to 6, the design of the vehicle contact arrangement and of the stationary contact arrangement has changed.

The charging strip 21' is in turn elongate and has a length of at least one meter. The stationary contacts 16', 17' and the auxiliary contacts 23', 24' also have approximately the same length, which contacts accordingly already come into contact with the contacts 14', 15' and the auxiliary contacts 26', 27' of the current collector 22', i.e., the vehicle contact arrangement, when the loading vehicle 5a drives into the transfer station 10.

The compressive force generation device 18 here has two spring clips 29, by which the charging strip 21 is fastened to a wall of the transfer unit 10 or to a stationary bracket arranged in the transfer unit 10.

The current collector 22' has a length that is somewhat smaller than the length of the charging strip 21', for example, half the length of the charging strip 21'.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A block storage arrangement comprising:
   multiple container stacking compartments;
   a loading compartment arranged below the container stacking compartments;
   at least one loading vehicle, which is movable in the loading compartment and with which containers are storable from below into a container stacking compartment and/or removable from below from the container stacking compartment, has an electric drive assembly and an electrically rechargeable battery; and
   at least one transfer station,
   wherein an electrical charging device for the battery is arranged in the transfer station.

2. The block storage arrangement according to claim 1, wherein the electrical charging device has a stationary contact arrangement and the at least one loading vehicle has a vehicle contact arrangement, and
   wherein the vehicle contact arrangement comes into contact with the stationary contact arrangement when the at least one loading vehicle is driven into the transfer station.

3. The block storage arrangement according to claim 2, wherein at least one of the stationary contact arrangement or the vehicle contact arrangement has a compressive force generation device, which acts in the direction of an other of the at least one of the stationary contact arrangement or the vehicle contact arrangement when the loading vehicle is located in the transfer station.

4. The block storage arrangement according to claim 1, wherein the electrical charging device is designed for a charging current having a current intensity of at least 80 amperes.

5. The block storage arrangement according to claim 4, wherein the electrical charging device is designed for a charging current having a current intensity in a range of 80 to 140 amperes.

6. The block storage arrangement according to claim 1, wherein the electrical charging device is adapted to the battery and charges the battery at a C-rate of at least 10.

7. The block storage arrangement according to claim 1, wherein the loading vehicle has an electric drive and a lifting device that is operatively connected to the electric drive, and
   wherein the electric drive operates as an electric generator and feeds electrical energy into the battery when the lifting device is lowered.

8. The block storage arrangement according to claim 1, wherein the battery is a lithium-titanium-oxide battery.

9. A method for operating a block storage arrangement having multiple container stacking compartments, a loading compartment arranged below the container stacking compartments, and a loading vehicle, movable in the loading compartment, to store containers from below in the container stacking compartments and to remove containers downwardly from the container stacking compartments, the loading vehicle having a rechargeable battery by which the loading vehicle is electrically driven, the method comprising:

driving the loading vehicle into a transfer station; and charging the rechargeable battery while the loading vehicle is located in the transfer station.

10. The method according to claim 9, wherein, when driving into the transfer station, the loading vehicle automatically establishes contact between the rechargeable battery and an electrical charging device.

11. The method according to claim 9, wherein the rechargeable battery is charged at a C-rate of at least 10.

12. The method according to claim 9, wherein, during a stay in the transfer station, the rechargeable battery is supplied with an amount of energy which corresponds to at least an amount of energy that the loading vehicle consumes in an average working cycle between two stays in the transfer station.

13. The method according to claim 9, wherein the loading vehicle further has an electric drive and a lifting device that is operatively connected to the electric drive, and the method further comprises operating the electric drive as a generator when the lifting device is lowered.

14. The method according to claim 9, wherein the rechargeable battery is a lithium-titanium-oxide battery.

15. The block storage arrangement according to claim 1, wherein the electrical charging device charges the battery at least with an amount of energy that the loading vehicle consumes on average in a working cycle between two stays in the transfer station.

* * * * *